(12) United States Patent
Yoshida

(10) Patent No.: US 10,296,493 B2
(45) Date of Patent: May 21, 2019

(54) DISTRIBUTED DATA PROCESSING SYSTEM AND DISTRIBUTED DATA PROCESSING METHOD

(71) Applicant: NEC Corporation, Minato-ku, Tokyo (JP)

(72) Inventor: Shinichiro Yoshida, Tokyo (JP)

(73) Assignee: NEC CORPORATIOn, Tokyo (JP)

( * ) Notice: Subject to any disclaimer, the term of this patent is extended or adjusted under 35 U.S.C. 154(b) by 689 days.

(21) Appl. No.: 14/439,082

(22) PCT Filed: Oct. 30, 2013

(86) PCT No.: PCT/JP2013/006437
§ 371 (c)(1),
(2) Date: Apr. 28, 2015

(87) PCT Pub. No.: WO2014/068980
PCT Pub. Date: May 8, 2014

(65) Prior Publication Data
US 2015/0293936 A1    Oct. 15, 2015

(30) Foreign Application Priority Data
Nov. 1, 2012   (JP) .................................. 2012-241993

(51) Int. Cl.
*G06F 17/30* (2006.01)
*G06F 16/182* (2019.01)
*G06F 9/50* (2006.01)

(52) U.S. Cl.
CPC .............. *G06F 16/182* (2019.01); *G06F 9/50* (2013.01)

(58) Field of Classification Search
CPC ...................................................... G06F 17/30
See application file for complete search history.

(56) References Cited

U.S. PATENT DOCUMENTS

2005/0198275 A1* 9/2005 D'Alo ................ G06F 11/3006
                                                    709/224
2011/0179100 A1* 7/2011 Kawai .................. G06F 9/5066
                                                    709/201
(Continued)

FOREIGN PATENT DOCUMENTS

CN         102713862 A      10/2012
JP         H07-325806 A     12/1995
(Continued)

OTHER PUBLICATIONS

The extended European Search Report of EP Application No. 13851403.9 dated Mar. 16, 2016.
(Continued)

*Primary Examiner* — Khanh B Pham

(57) ABSTRACT

A distributed data processing system to efficiently execute distributed processing on pairs of a plurality of types of data is provided. A distributed data processing system 100 performs a predetermined arithmetic process on each of pairs of N types of data, where N is a natural number greater than or equal to 2. The distributed data processing system 100 includes a management unit 111 and a plurality of processing unit 121. The management unit 111 allocates each of first to $N-1^{th}$ types out of the N types to any of the plurality of processing unit 121. Each of the plurality of processing unit 121 executes the predetermined arithmetic process on pairs of $i^{th}$ type of data and each of $i+1^{th}$ to $N^{th}$ types of data, where i is a natural number greater than or equal to 1 and less than or equal to N−1, the $i^{th}$ type being allocated by the management unit.

14 Claims, 10 Drawing Sheets

(56) References Cited

U.S. PATENT DOCUMENTS

| | | |
|---|---|---|
| 2012/0030522 A1 | 2/2012 | Yabuki |
| 2012/0254443 A1* | 10/2012 | Ueda .................. H04L 67/1008 |
| | | 709/226 |
| 2013/0055037 A1 | 2/2013 | Nonogaki |
| 2013/0151907 A1 | 6/2013 | Nakagawa |

FOREIGN PATENT DOCUMENTS

| | | |
|---|---|---|
| JP | 2006-146668 A | 6/2006 |
| JP | 2009-199533 A | 9/2009 |
| JP | 4872944 A | 9/2009 |
| JP | 2010-97489 A | 4/2010 |
| WO | 2011/070910 A1 | 6/2011 |
| WO | 2012/101933 A1 | 8/2012 |
| WO | 2012/128388 A1 | 9/2012 |

OTHER PUBLICATIONS

Chinese Office Action for CN Application No. 201380057593.9 dated Jul. 31, 2017 with English Translation.

International Search Report for PCT Application No. PCT/JP2013/006437, dated Jan. 21, 2014.

The Apache Software Foundation, "Hadoop", [online], retrieved on Sep. 27, 2012, Internet <URL : http://hadoop.apache.org/index.html>.

English translation of Written Opinion for PCT Application No. PCT/JP2013/006437.

\* cited by examiner

Fig. 7

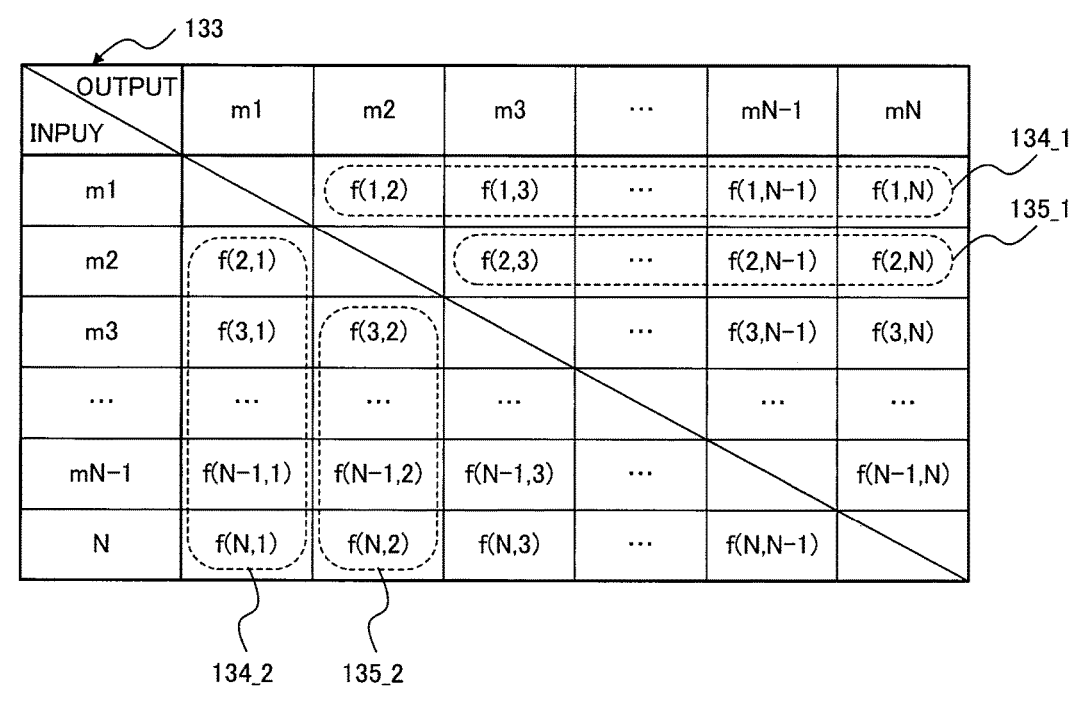

| OUTPUT / INPUY | m1 | m2 | m3 | ... | mN-1 | mN |
|---|---|---|---|---|---|---|
| m1 | | f(1,2) | f(1,3) | ... | f(1,N-1) | f(1,N) |
| m2 | f(2,1) | | f(2,3) | ... | f(2,N-1) | f(2,N) |
| m3 | f(3,1) | f(3,2) | | ... | f(3,N-1) | f(3,N) |
| ... | ... | ... | ... | | ... | ... |
| mN-1 | f(N-1,1) | f(N-1,2) | f(N-1,3) | ... | | f(N-1,N) |
| N | f(N,1) | f(N,2) | f(N,3) | ... | f(N,N-1) | |

DISTRIBUTED DATA PROCESSING SYSTEM AND DISTRIBUTED DATA PROCESSING METHOD

This application is a National Stage Entry of PCT/JP2013/006437 filed on Oct. 30, 2013, which claims priority from Japanese Patent Application 2012-241993 filed on Nov. 1, 2012, the contents of all of which are incorporated herein by reference, in their entirety.

TECHNICAL FIELD

The present invention relates to a distributed data processing system and a distributed data processing method and, in particular, to a distributed data processing system and a distributed data processing method that perform processing on each of pairs of a plurality of types of data.

BACKGROUND ART

PTL1 describes one example of an operation management system that uses time-series information about system performance to model a system and uses the generated model to detect a failure in the system.

The operation management system described in PTL1 determines a correlation function for each pair of a plurality of metrics on the basis of measured value of the plurality of metrics of a system to generate a correlation model of the system. The operation management system then uses the generated correlation model to detect destruction of a correlation (correlation destruction) and determines the cause of a failure on the basis of the correlation destruction. The technique to analyze the cause of a failure on the basis of correlation destruction in this way is called invariant relation analysis.

In the invariant relation analysis, correlation functions are calculated for all pairs of a plurality of metrics. The number of pairs for which correlation functions are calculated is proportional to the square of the number of metrics. Accordingly, if the scale (the number of metrics) of a system is large, the number of pairs for which correlation functions are calculated becomes huge, which makes it difficult to generate a correlation model in a predetermined period of time.

One way to perform calculation on a huge amount of data as described above is distributed processing. Among the known typical distributed processing techniques is, for example, Hadoop disclosed in NPL1. In Hadoop, an HDFS (Hadoop Distributed File System), which is a distributed file system, distributes data to be processed to a plurality of nodes. Then processing is executed by MapReduce on the plurality of nodes in parallel.

Note that a related technique is disclosed in PTL2 which is a method for determining nodes on which processing is executed in a distributed processing system such as Hadoop on the basis of delay in communication between nodes.

CITATION LIST

Patent Literature

[PTL1] Japanese Patent Publication No. 4872944
[PTL2] Japanese Patent Application Laid-open No. 2010-97489

Non Patent Literature

[NPL1] The Apache Software Foundation, "Hadoop", [online], retrieved on Sep. 27, 2012, Internet <URL: http://hadoop.apache.org/index.html>

SUMMARY OF INVENTION

Technical Problem

When Hadoop is used to perform the invariant relation analysis described above, each of pairs of a plurality of metrics, for example, are allocated to any of the nodes and each of the node calculates a correlation function for the allocated pair. In this case, every time a pair is allocated, each node needs to obtain metric data relating to the allocated pair from a node on which the data is distributed. Accordingly, many data transmissions between nodes occur. As seen from the above, Hadoop has a problem that distributed processing on each pair of a plurality of types of data cannot efficiently be performed.

An object of the present invention is to solve the problem and provide a distributed data processing system and a distributed data processing method that are capable of efficiently executing distributed processing on pairs of a plurality of types of data.

Solution to Problem

A distributed data processing system performing a predetermined arithmetic process on each of pairs of N types of data, where N is a natural number greater than or equal to 2, according to an exemplary aspect of the invention includes: a management means for allocating each of first to (N−1)th types out of the N types to any of a plurality of processing means; and the plurality of processing means for executing the predetermined arithmetic process on pairs of (i)th type of data and each of (i+1)th to (N)th types of data, where i is a natural number greater than or equal to 1 and less than or equal to N−1, the (i)th type being allocated by the management means.

A management device in a distributed data processing system performing a predetermined arithmetic process on each of pairs of N types of data, where N is a natural number greater than or equal to 2, according to an exemplary aspect of the invention includes: a management means for allocating each of first to (N−1)th types out of the N types to any of a plurality of processing device each of which executes the predetermined arithmetic process on pairs of (i)th type of data and each of (i+1)th to (N)th types of data, where i is a natural number greater than or equal to 1 and less than or equal to N−1, the (i)th type being allocated by the management device.

A processing device in a distributed data processing system performing a predetermined arithmetic process on each of pairs of N types of data, where N is a natural number greater than or equal to 2, according to an exemplary aspect of the invention includes: a processing means for executing the predetermined arithmetic process on pairs of (i)th type of data and each of (i+1)th to (N)th types of data, where i is a natural number greater than or equal to 1 and less than or equal to N−1, the (i)th type being allocated by the management device which allocates each of first to (N−1)th types out of the N types to any of a plurality of the processing devices.

A distributed data processing method for performing a predetermined arithmetic process on each of pairs of N types of data, where N is a natural number greater than or equal to 2, according to an exemplary aspect of the invention includes: in a management means, allocating each of first to (N−1)th types out of the N types to any of a plurality of processing means; and, in each of the plurality of processing means, executing the predetermined arithmetic process on pairs of (i)th type of data and each of (i+1)th to (N)th types of data, where i is a natural number greater than or equal to 1 and less than or equal to N−1, the (i)th type being allocated by the management means.

A first computer readable storage medium recording thereon a program for a management device in a distributed data processing system performing a predetermined arithmetic process on each of pairs of N types of data, where N is a natural number greater than or equal to 2, causes a computer to perform a method including: allocating each of first to (N−1)th types out of the N types to any of a plurality of processing means each of which executes the predetermined arithmetic process on pairs of (i)th type of data and each of (i+1)th to (N)th types of data, where i is a natural number greater than or equal to 1 and less than or equal to N−1, the (i)th type being allocated by the management device.

A second computer readable storage medium recording thereon a program for a processing device in a distributed data processing system performing a predetermined arithmetic process on each of pairs of N types of data, where N is a natural number greater than or equal to 2, causes a computer to perform a method including: executing the predetermined arithmetic process on pairs of (i)th type of data and each of (i+1)th to (N)th types of data, where i is a natural number greater than or equal to 1 and less than or equal to N−1, the (i)th type being allocated by the management device which allocates each of first to (N−1)th types out of the N types to any of a plurality of the processing devices.

Advantageous Effects of Invention

An advantageous effect of the present invention is that distributed processing on pairs of a plurality of types of data can be efficiently executed.

BRIEF DESCRIPTION OF DRAWINGS

FIG. 7 is a diagram illustrating an example of processing results 133 in the first exemplary embodiment of the present invention.

DESCRIPTION OF EMBODIMENTS

Exemplary embodiments will be described herein with an example in which a distributed data processing system 100 generates a correlation model in an operation management system 500 that performs invariant relation analysis for a system.

First Exemplary Embodiment

A first exemplary embodiment of the present invention will be described.

Figure 2:
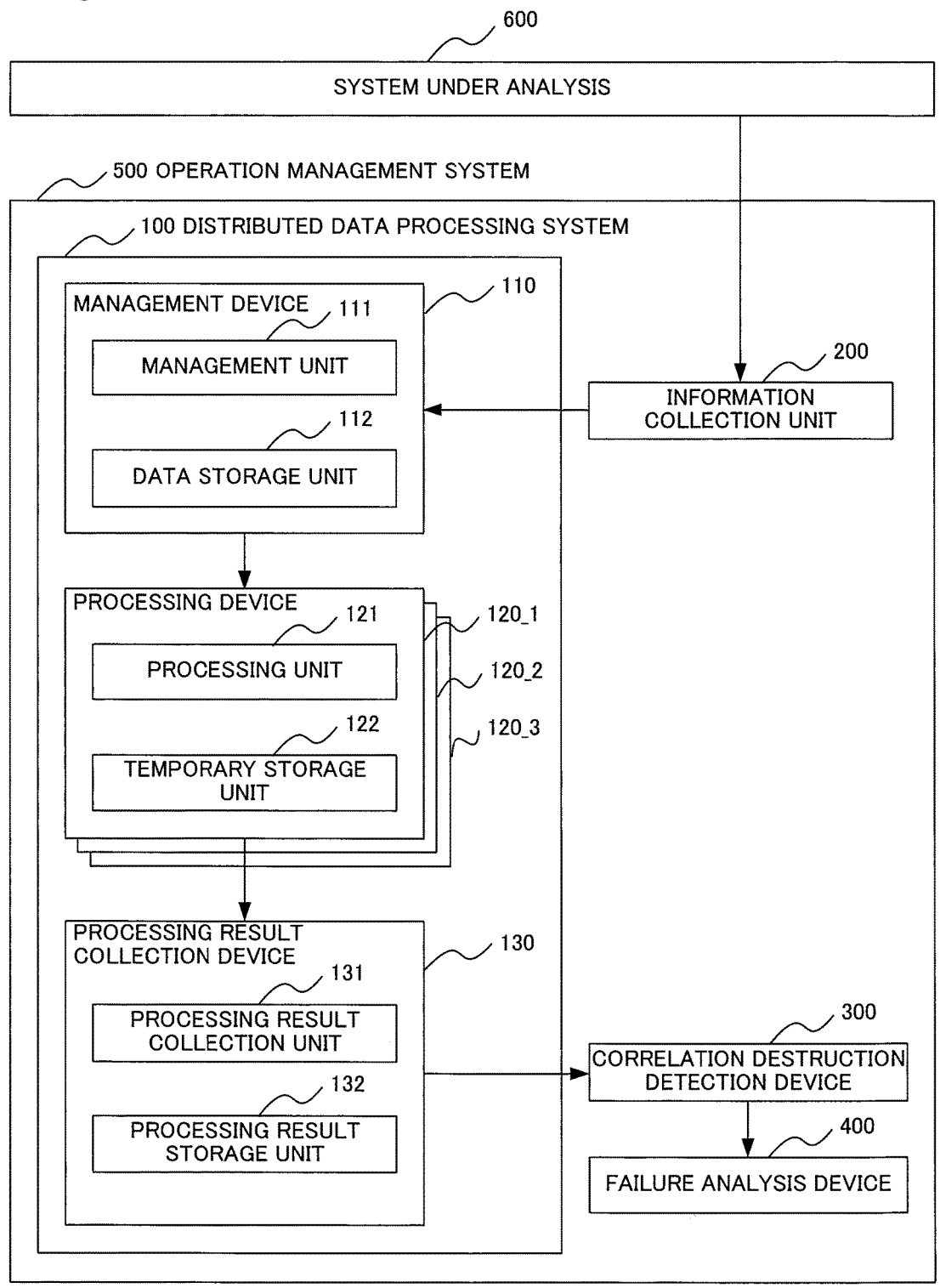
FIG. 2 is a block diagram illustrating a configuration of an operation management system 500 in the first exemplary embodiment of the present invention.

A configuration of the first exemplary embodiment will be described first. FIG. 2 is a block diagram illustrating a configuration of an operation management system 500 in the first exemplary embodiment of the present invention.

The operation management system 500 generates a correlation model of a system under analysis 600 on the basis of performance information collected from the system under analysis 600 and uses the generated correlation model to detect failures and anomalies in the system under analysis 600.

The system under analysis 600 includes one or more monitored devices that execute service processing, such as a WEB server, an application server (AP server) or a database (DB server). The monitored device measures measurement data (measurement values) of a plurality of items of performance values at regular intervals (predetermined performance information collection intervals) and sends the measurement data to the operation management system 500. Examples of performance value items used include usage rates or the quantity of usage of computer resources such as the CPU (Central Processing Unit) usage rate, memory usage rate, disk access frequency, and network usage rate.

A set of a monitored device and a performance value item is referred to as a metric (a performance type or simply a type) and a set of values of N types of metrics (N is a natural number that satisfies 2≤N) measured at the same time instant is referred to as performance information. Furthermore, a metric is equivalent to an element in PTL1.

The operation management system 500 includes a distributed data processing system (correlation model generation system) 100, an information collection device 200, a correlation destruction detection device 300 and a failure analysis device 400.

The information collection device 200 collects performance information from the monitored devices of the system under analysis 600 at predetermined performance information collection intervals and sends the performance information to a management device 110 of the distributed data processing system 100.

The distributed data processing system 100 generates a correlation model for the system under analysis 600 on the basis of performance information. The correlation model includes correlation functions for pairs of N types of metrics. The correlation function is a function for predicting a time series of values for one of a pair of metrics from a time series of values for the other of the pair of metrics and represents the correlation between the pair of metrics.

The distributed data processing system 100 includes the management device 110, a plurality of processing devices 120 (120_1, 120_2, . . . ) and a processing result collection device 130.

The management device 110 includes a management unit 111 (or a master) and a data storage unit 112.

The data storage unit 112 stores a time series of performance information received from the information collection device 200 as processing data 113.

Figure 5:
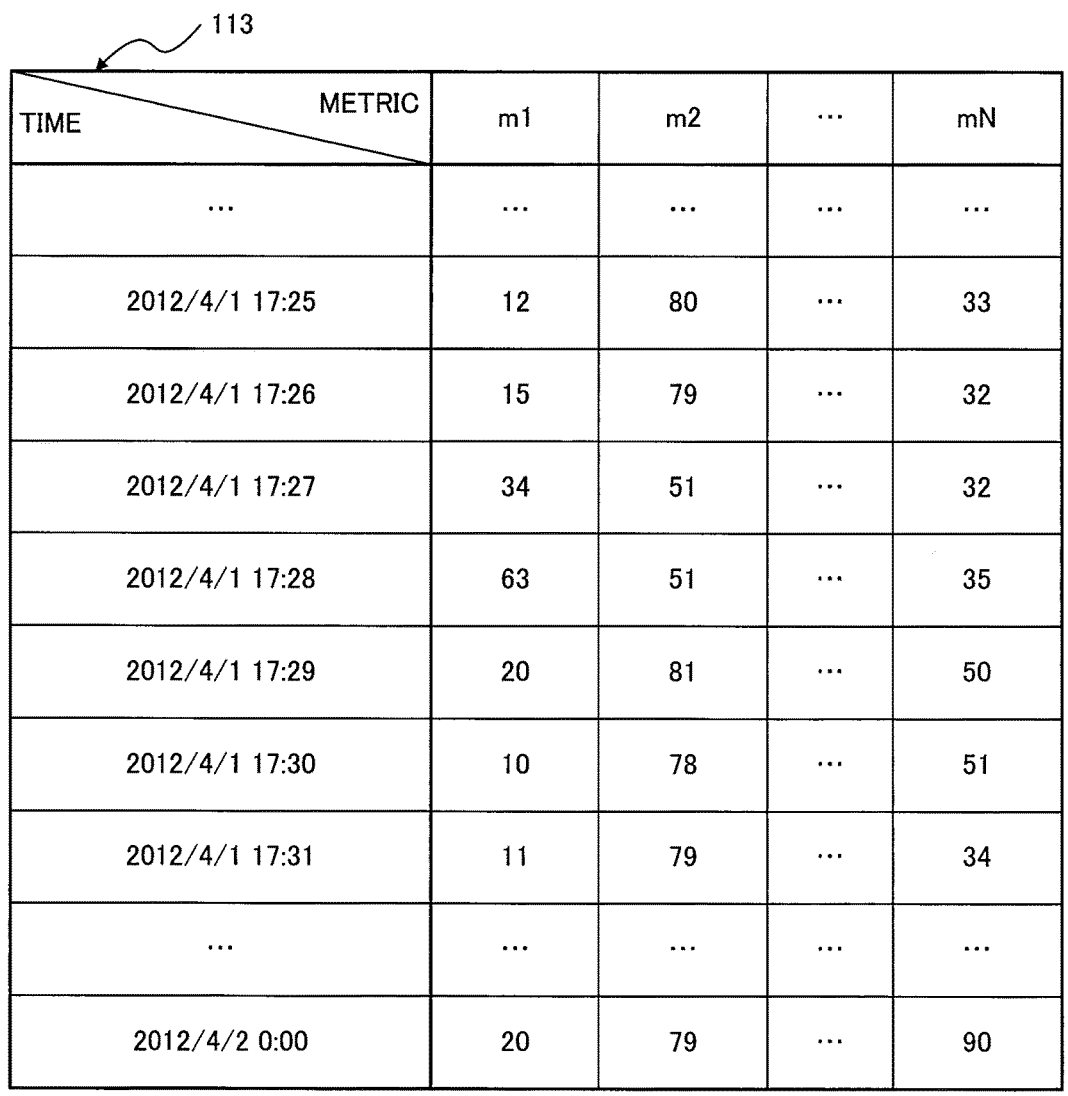
FIG. 5 is a diagram illustrating an example of processing data 113 in the first exemplary embodiment to of the present invention.

FIG. 5 is a diagram illustrating an example of the processing data 113 in the first exemplary embodiment of the present invention. In the example in FIG. 5, performance information includes measurement values (data) of N types of metrics ($m_1, m_2, \ldots, m_N$).

In response to a request from the processing unit 121 of any of the processing devices 120, the management unit 111 allocates each of the first to (N−1)th types out of the N types of metrics to the processing device 120.

Each processing device 120 includes a processing unit 121 (or a worker) and a temporary storage unit 122.

The processing unit 121 calculates a correlation function for a pair of a metric allocated by the management device 110 and another metric. If the $i^{th}$ ($1 \leq i \leq N-1$) is allocated, the processing unit 121 calculates a correlation function for each of pairs of the $i^{th}$ metric ($m_i$) and each of the $i+1^{th}$ to $N^{th}$ metrics ($m_j$, $i+1 \leq j \leq N$). The processing unit 121 acquires measurement values of each of the pairs of metrics from the management device 110 and performs a system identification process like the operation management device in PTL1 to determine coefficients of the correlation function. The processing unit 121 stores the measurement values of the metrics acquired from the management device 110 in the temporary storage unit 122.

The temporary storage unit 122 temporarily stores (caches) metric data acquired from the data storage unit 112.

Figure 6:
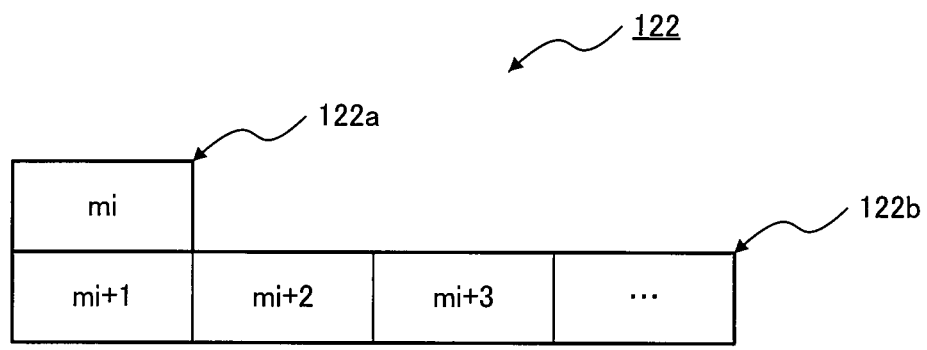
FIG. 6 is a diagram illustrating an example of data stored in a temporary storage unit 122 in the first exemplary embodiment of the present invention.

FIG. 6 is a diagram illustrating an example of data stored in the temporary storage unit 122 in the first exemplary embodiment of the present invention. As illustrated in FIG. 6, the temporary storage unit 122 may be divided into two parts: a temporary storage unit 122a (a first temporary storage unit) that stores data of the $i^{th}$ metric ($m_i$) and a temporary storage unit 122b (a second temporary storage unit) that stores data of the $i+1^{th}$ to $N^{th}$ metrics ($m_j$, $i+1 \leq j \leq N$). The temporary storage unit 122b may store data of predetermined number of metrics out of the $i+1^{th}$ to $N^{th}$ metrics ($m_j$, $i+1 \leq j \leq N$). In that case, the temporary storage unit 122b may store data of metrics in FIFO (First-In First-Out) mode, for example. Alternatively, the temporary storage unit 122b may store data of metrics in a mode other than FIFO in which as many metrics that have larger i as possible are left.

The processing result collection device 130 includes a processing result collection unit 131 and a processing result storage unit 132.

The processing result collection unit 131 acquires correlation functions calculated on the processing devices 120 and stores the correlation functions in the processing result storage unit 132 as processing results 133.

The processing result storage unit 132 stores processing results 133. The processing results 133 represent a correlation model of the system under analysis 600.

FIG. 7 is a diagram illustrating an example of the processing results 133 in the first exemplary embodiment of the present invention. In FIG. 7, f(i, j) represents a correlation function for a pair of an input metric $m_i$ and an output metric $m_j$. For example, if the correlation function f(i, j) is in the form $m_j = \alpha \times m_i + \beta$, the coefficients $\alpha$ and $\beta$ are determined for a pair of $m_i$ and $m_j$. Note that any other function expression, with which a time series of values for one of a pair of metrics can be predicted from a time series of values for the other metric, may be used as a correlation function.

The correlation destruction detection device 300 uses newly input performance information to detect correlation destruction of a correlation included in a correlation model as in PTL1.

The failure analysis device 400 estimates the cause of a failure on the basis of a result of detection of correlation destruction as in PTL1.

Note that each of the management device 110, the processing devices 120, the processing result collection device 130, the information collection device 200, the correlation destruction detection device 300 and the failure analysis device 400 may be a computer that includes a CPU and a storage medium storing a program and operates under the control based on the program. Alternatively, each of the management device 110, the processing devices 120, the processing result collection device 130, the information collection device 200, the correlation destruction detection device 300 and the failure analysis device 400 may be a virtual computer (a virtual machine) constructed on a computer. Alternatively, some of the management device 110, the processing devices 120, the processing result collection device 130, the information collection device 200, the correlation destruction detection device 300 and the failure analysis device 400 may make up one device.

An operation of the first exemplary embodiment will be described below.

Figure 3:
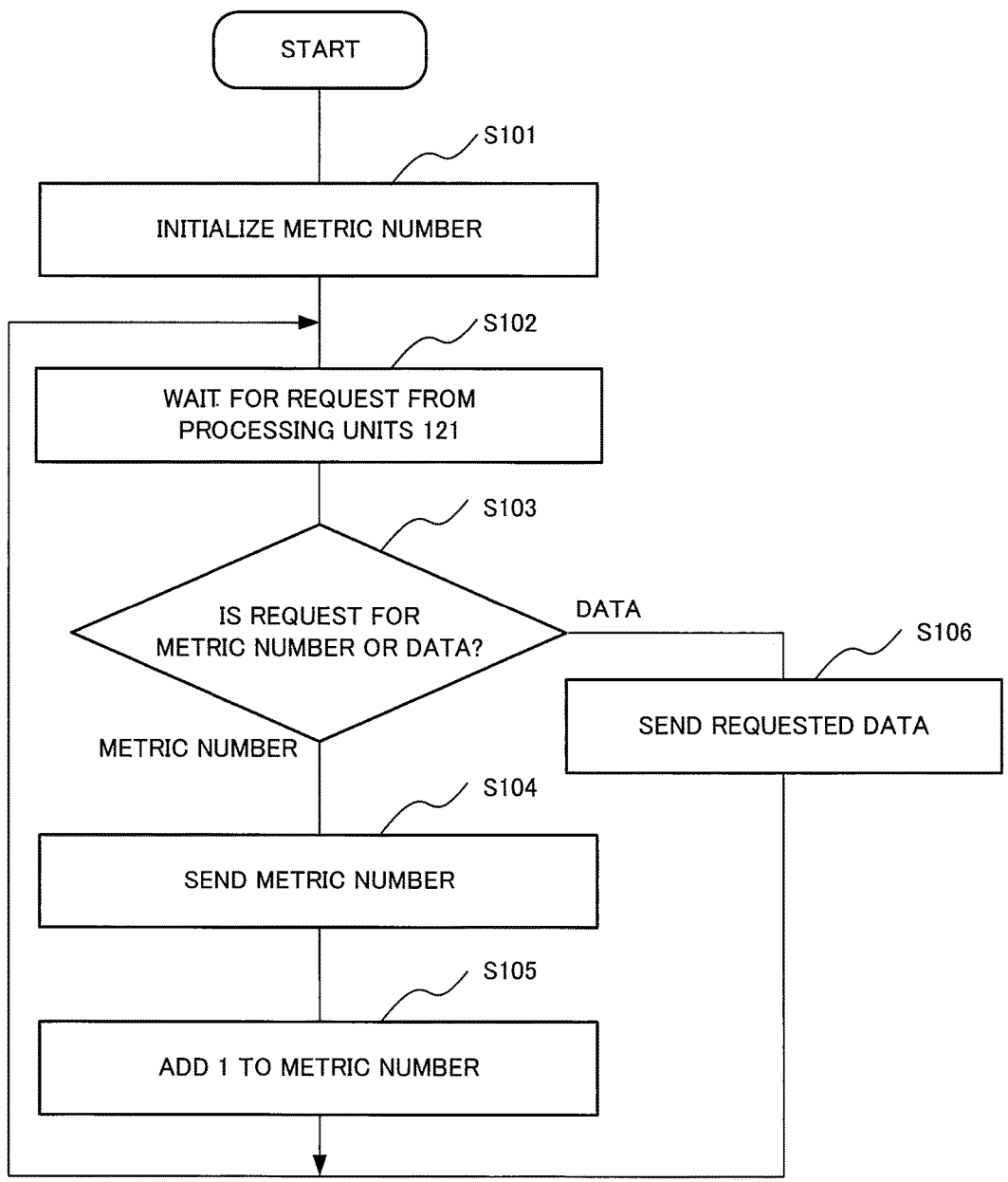
FIG. 3 is a flowchart illustrating a process performed by a management unit 111 in the first exemplary embodiment of the present invention.

FIG. 3 is a flowchart illustrating a process performed by the management unit 111 in the first exemplary embodiment of the present invention.

It is assumed here that the information collection device 200 has collected performance information from the system under analysis 600 and, as a result, processing data 113 relating to N types of metrics as illustrated in FIG. 5 has been stored in the data storage unit 112 of the management device 110.

First, the management unit 111 of the management device 110 initializes a metric number to 1 (step S101).

The management unit 111 waits for a request from the processing unit 121 of any of the processing devices 120 (step S102).

If a request from the processing unit 121 is a request for a metric number ("Metric number" at step S103) and the metric number is less than N, the management unit 111 sends the metric number to the processing unit 121 (step S104).

The management unit 111 adds 1 to the metric number (step S105).

If the request from the processing unit 121 is data of a metric, ("Data" at step S103), the management unit 111 acquires data of the metric associated with the requested metric number from the data storage unit 112 and sends the data to the processing unit 121 (step S106).

The management unit 111 repeats the process from step S102 through step S106.

Figure 4:
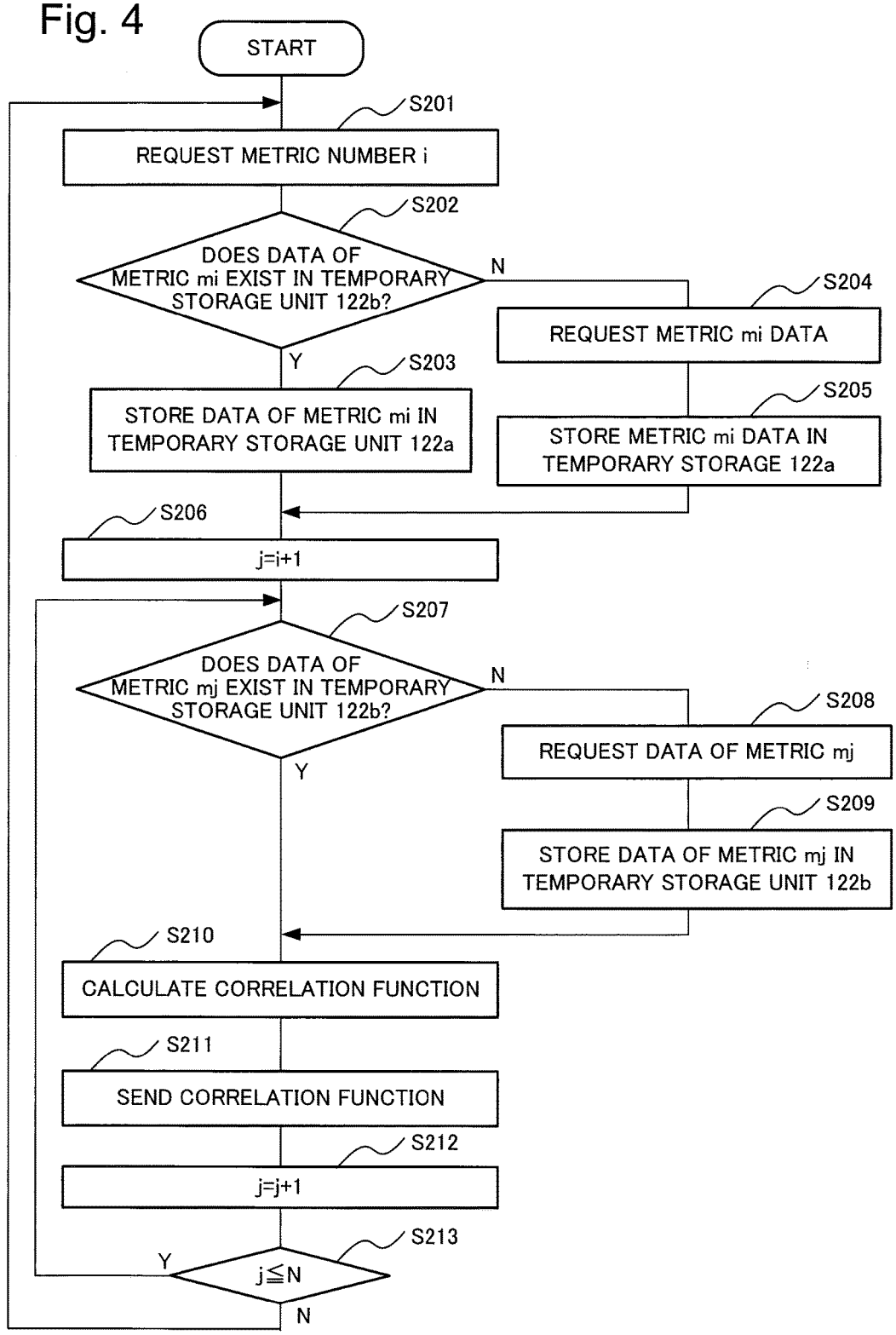
FIG. 4 is a flowchart illustrating a process performed by a processing unit 121 in the first exemplary embodiment of the present invention.

FIG. 4 is flowchart illustrating a process performed by a processing unit 121 in the first exemplary embodiment of the present invention.

First, the processing unit 121 of each processing device 120 requests a metric number i from the management unit 111 (step S201) and acquires the metric number i.

The processing unit 121 determines whether or not there is data of the metric $m_i$ in the temporary storage unit 122b (step S202).

If the data of the metric $m_i$ is in the temporary storage unit 122b (Y at step S202), the processing unit 121 acquires the data of the metric $m_i$ from the temporary storage unit 122b and stores the data in the temporary storage unit 122a (step S203).

If the data of the metric $m_i$ is not in the temporary storage unit 122b (N at step S202), the processing unit 121 requests the data of the metric $m_i$ from the management unit 111 (step S204) and acquires the data of the metric $m_i$.

The processing unit 121 stores the data of the metric $m_i$ in the temporary storage unit 122a (step S205).

The processing unit 121 then initializes the metric number j to i+1 (step S206).

The processing unit 121 determines whether or not there is data of the metric $m_j$ in the temporary storage unit 122b (step S207).

If there is no data of the metric $m_j$ in the temporary storage unit 122b (N at step S207), the processing unit 121 requests the data of the metric $m_j$ from the management unit 111 (step S208) and acquires the data of the metric $m_j$.

The processing unit 121 stores the data of the metric $m_j$ in the temporary storage unit 122b (step S209). Data of metrics are stored in FIFO mode, for example, in the temporary storage unit 122b.

The processing unit 121 calculates a correlation function f(i, j) for the pair of the metrics $m_i$ and $m_j$ (step S210). If the input and output of the correlation function f(i, j) is not commutative (i.e. if f(i, j) is not equal to f(j, i)), the processing unit 121 also calculates the correlation function f(j, i).

The processing unit 121 sends the calculated correlation function(s) to the processing result collection unit 131 of the processing result collection device 130 (step S211). The processing result collection unit 131 sets the correlation function(s) acquired from the processing device 120 in the processing results 133 in the processing result storage unit 132.

The processing unit 121 adds 1 to the metric number j (step S212) and, if j is less than or equal to N (Y at step S213), repeats the process from step S207 through step S212 (step S213).

Then the processing unit 121 repeats the process from step S201 through step S213.

For example, the management unit 111 assigns metric numbers 1 to N−1 in order to the processing unit 121 in response to requests from the processing unit 121.

The processing unit 121_1 acquires a metric number, i=1, from the management unit 111. The processing unit 121_1 acquires data of metric $m_1$ from the management unit 111 and stores the data in the temporary storage unit 122a. The processing unit 121_1 then acquires data of metric $m_2$ from the management unit 111 and stores the data in the temporary storage unit 122b. The processing unit 121_1 calculates a correlation function f(1, 2) and a correlation function f(2, 1) for the pair of metrics ($m_1$, $m_2$). The processing unit 121_1 further acquires data of metric $m_3$ from the management unit 111 and stores the data in the temporary storage unit 122b. The processing unit 121_1 calculates a correlation function f(1, 3) and a correlation function f(3, 1) for the pair of metrics ($m_1$, $m_3$). In this way, the processing unit 121_1 calculates correlation functions f(1, 2), f(1, 3), f(1, 4), . . . , f(1, N) and correlation functions f(2, 1), f(3, 1), f(4, 1), . . . , f(N, 1) (a group of correlation functions 134_1 and a group of correlation functions 134_2 in the processing results 133 in FIG. 7) for the pairs of metrics ($m_1$, $m_2$), ($m_1$, $m_3$), ($m_1$, $m_4$), . . . , ($m_1$, $m_N$).

The processing unit 121_2 acquires a metric number, i=2, from the management unit 111. The processing unit 121_2 acquires data of metric $m_2$ from the management unit 111 and stores the data in the temporary storage unit 122a. The processing unit 121_2 then acquires data of metric $m_3$ from the management unit 111 and stores the data in the temporary storage unit 122b. The processing unit 121_2 calculates a correlation function f(2, 3) and a correlation function f(3, 2) for the pair of metrics ($m_2$, $m_3$). In this way, the processing unit 121_2 calculates correlation functions f(2, 3), f(2, 4), . . . , f(2, N) and correlation functions f(3, 2), f(4, 2), . . . , f(N, 2) (a group of correlation functions 135_1 and a group of correlation functions 135_2 in the processing results 133 in FIG. 7) for the pairs of metrics ($m_2$, $m_3$), ($m_2$, $m_4$), . . . , ($m_2$, $m_N$).

Then the processing unit 121_1 acquires a metric number k (where k satisfies the relation of the previously acquired i<k≤N−1) from the management unit 111. The processing unit 121_1 calculates correlation functions f(k, k+1), f(k, k+2), . . . , f(k, N) and correlation functions f(k+1, k), f(k+2, k), . . . , f(N, k) for pairs of metrics ($m_k$, $m_{k+1}$), ($m_k$, $m_{k+2}$), . . . , ($m_k$, $m_N$). If there is data of metric $m_k$ in the temporary storage 122b, the processing unit 121_1 acquires the data of the metric $m_k$ from the temporary storage unit 122b, stores the data in the temporary storage 122a and use the data. If there is data of metrics $m_{k+1}$ to $m_N$ in the temporary storage unit 122b, the processing unit 121_1 uses those pieces of data.

In this way, correlation functions are calculated for all the pairs in the N types of metrics by a plurality of processing units 121 and processing results 133 (a correlation model) as given in FIG. 7 are stored in the processing result storage unit 132.

Subsequently, detection of correlation destruction by the correlation destruction detection device 300 and estimation of the cause of a failure by the failure analysis device 400 are performed using the correlation model stored in the processing result storage unit 132 in the same way as in PTL1.

This completes the operation of the first exemplary embodiment of the present invention.

Figure 1:
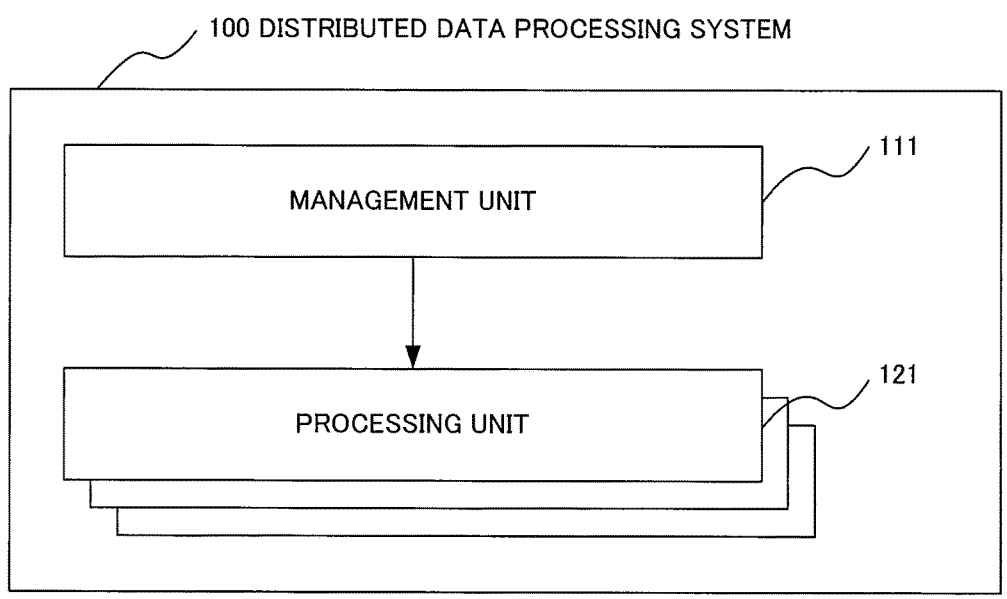
FIG. 1 is a block diagram illustrating a characteristic configuration of a first exemplary embodiment of the present invention.

A characteristic configuration of the first exemplary embodiment of the present invention will be described next. FIG. 1 is a block diagram illustrating the characteristic configuration of the first exemplary embodiment of the present invention.

A distributed data processing system 100 performs a predetermined arithmetic process on each of pairs of N types of data, where N is a natural number greater than or equal to 2. A distributed data processing system 100 includes a management unit 111 and a plurality of processing unit 121. The management unit 111 allocates each of first to N−1$^{th}$ types out of the N types to any of the plurality of processing unit 121. Each of the plurality of processing unit 121 executes the predetermined arithmetic process on pairs of i$^{th}$ type of data and each of i+1$^{th}$ to N$^{th}$ types of data, where i is a natural number greater than or equal to 1 and less than or equal to N−1, the i$^{th}$ type being allocated by the management unit.

Advantageous effects of the first exemplary embodiment of the present invention will be described below.

According to the first exemplary embodiment of the present invention, distributed processing on pairs of a plurality of types of data can be efficiently executed. This is because the management unit 111 allocates each of the first to N−1$^{th}$ types among N types of data to any of a plurality of processing units 121 and each of the plurality of processing units 121 executes a predetermined arithmetic process on pairs of the $i^{th}$ type of data and each of the $i+1^{th}$ to $N^{th}$ types of data allocated by the management unit 111.

For example, if each of the processing units 121 acquires data relating to a pair every time such pair is allocated, the number of data transmissions will be (2×(number of pairs)) =(2N(N−1)/2). According to the first exemplary embodiment of the present invention, in contrast, the number of data transmissions is reduced to ((N−1)+(number of pairs))=((N+2)(N−1)/2).

Furthermore, the number of data transmissions is further reduced, because the management unit 111 allocates the first to N−1$^{th}$ types out of N types of data in order, each processing unit 121 stores the $i+1^{th}$ to $N^{th}$ types of data in the temporary storage unit 122b, and the $k^{th}$ type of data (where k satisfies the relation of the previously acquired i<k≤N−1) that is allocated to the processing unit 121 next time and the $k+1^{th}$ to $N^{th}$ types of data are stored in the temporary storage unit 122b.

The reduction of the number of data transmissions as described above reduces the load on I/O (input/output) of the management device 110, the processing devices 120 and the processing result collection device 130.

Second Exemplary Embodiment

A second exemplary embodiment of the present invention will be described next.

In an operation management system 500, there are situations where a correlation model for a system under analysis 600 changes with time. In such a case, generation of a correlation model and, in addition, analysis using the correlation model needs to be performed before the correlation model changes; therefore, the generation of the correlation model needs to be completed in a short time. In the second exemplary embodiment of the present invention, processing units 121 are dynamically added so that calculation of correlation functions for all of the pairs among N types of metrics can be completed within a processing completion time.

Figure 8:
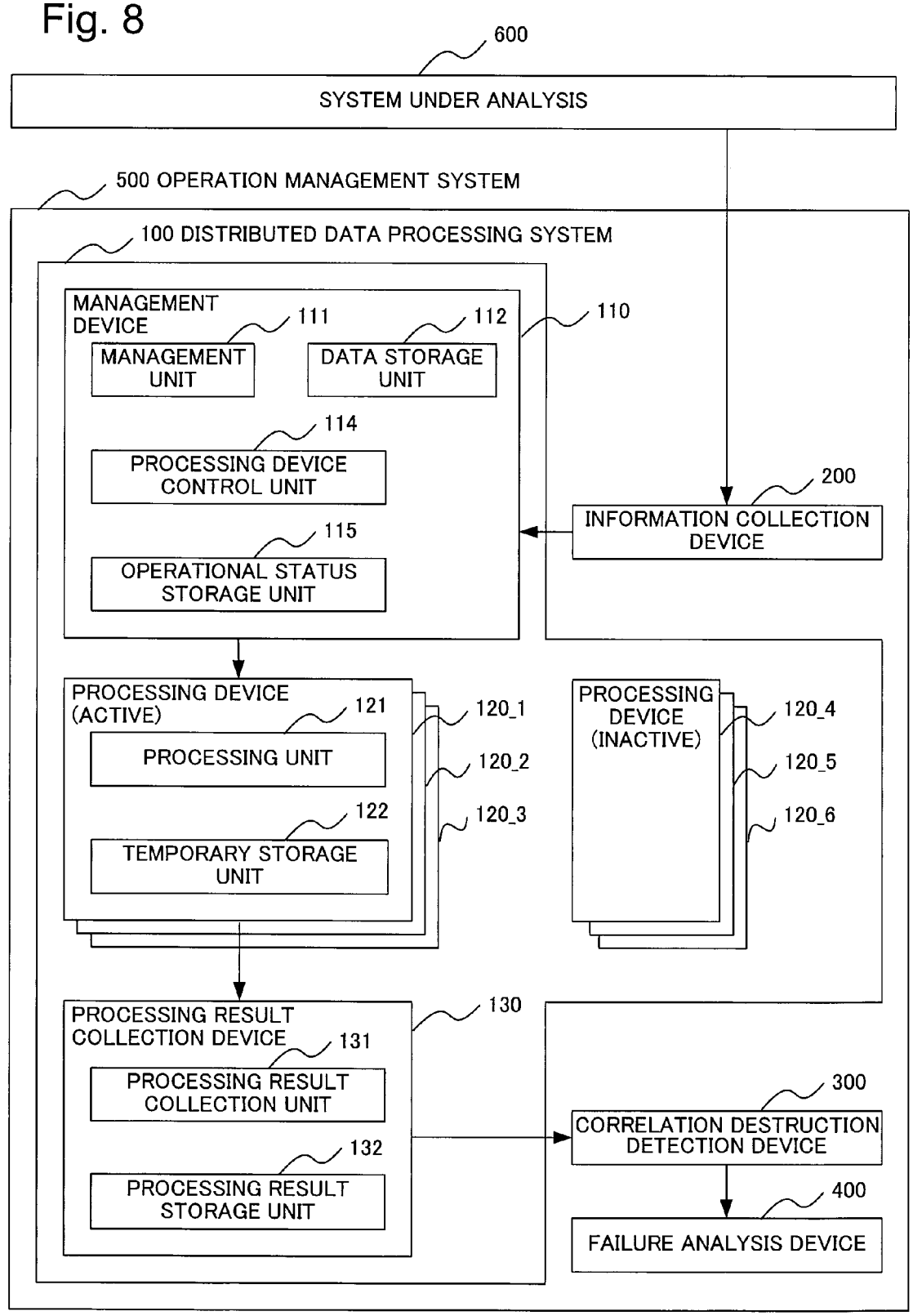
FIG. 8 is a block diagram illustrating a configuration of an operation management system 500 in a second exemplary embodiment of the present invention.

A configuration of the second exemplary embodiment of the present invention will be described first. FIG. 8 is a block diagram illustrating a configuration of an operation management system 500 in the second exemplary embodiment of the present invention.

Referring to FIG. 8, a distributed data processing system 100 includes active processing devices 120 (120_1, 120_2, . . . ) and inactive processing devices 120 (120_4, 120_5, . . . ). The active processing devices 120 perform the process from step S201 through step S213 (FIG. 4) to calculate correlation functions. A management device 110 further includes a processing device control unit 114 (or a control unit) and an operational status storage unit 115.

The operational status storage unit 115 stores operational status information 116 indicating whether the processing devices 120 are active or inactive.

Figure 10:
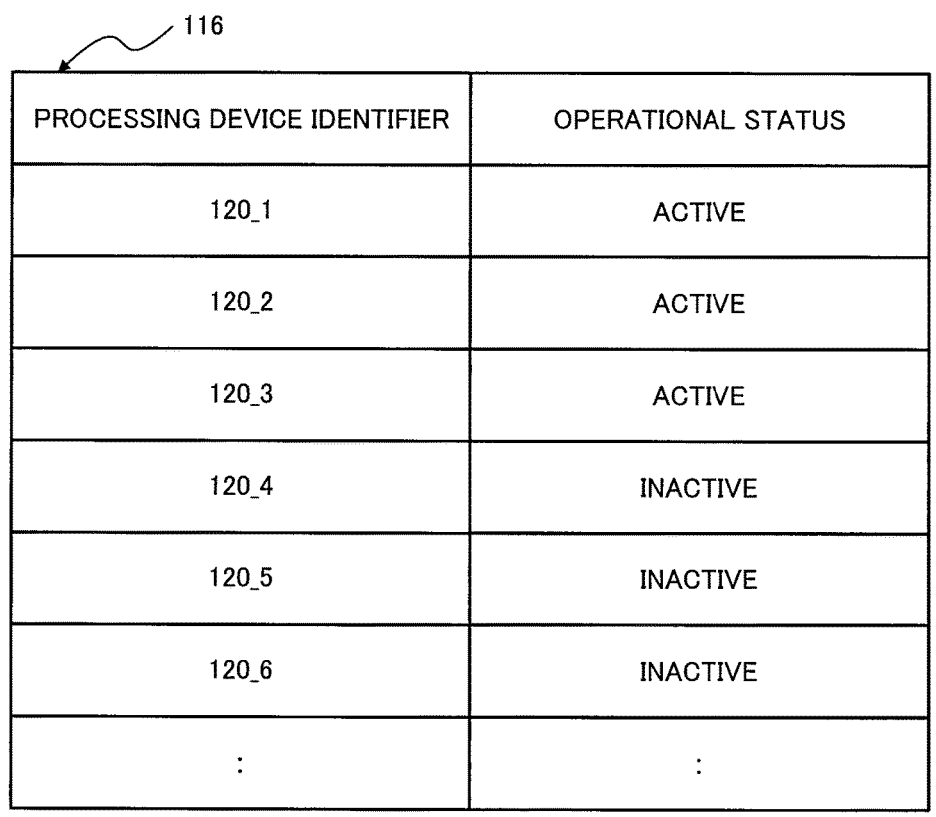
FIG. 10 is a diagram illustrating an example of operational status information 116 in the second exemplary embodiment of the present invention.

FIG. 10 is a diagram illustrating an example of operational status information 116 in the second exemplary embodiment of the present invention. In the example in FIG. 10, the operational status information 116 includes the identifiers of processing devices 120 and operational status (indications of whether active or inactive) of the processing devices 120.

The processing device control unit 114 calculates predicted processing time required for calculation by the active processing device 120 of correlation functions for all pairs among N types of metrics and activates inactive processing devices 120 (adds processing devices 120) on the basis of the predicted processing time.

An operation of the second exemplary embodiment of the present invention will be described below.

Figure 9:
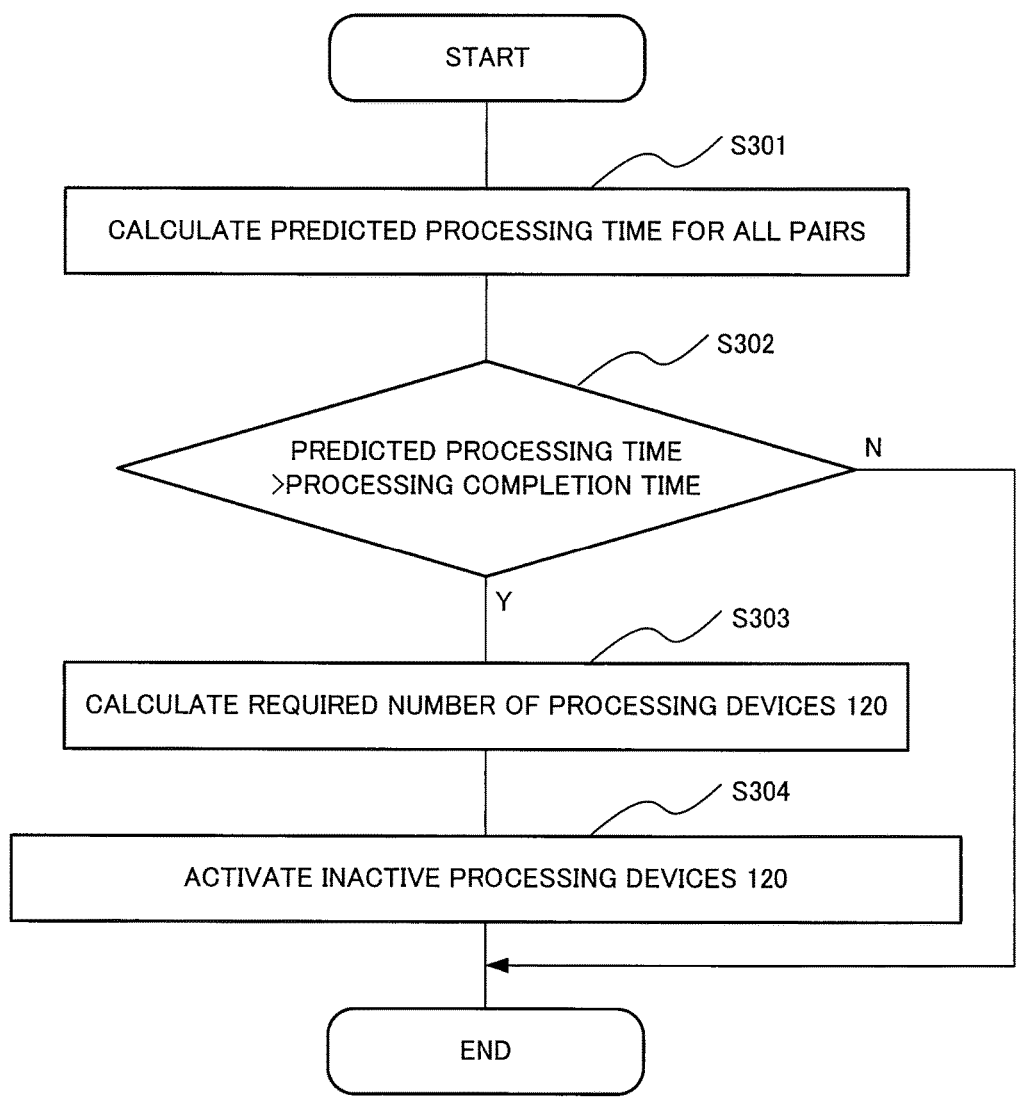
FIG. 9 is a flowchart illustrating a process performed by a processing device control unit 114 in the second exemplary embodiment of the present invention.

FIG. 9 is a flowchart illustrating a process performed by the processing device control unit 114 in the second exemplary embodiment of the present invention.

It is assumed here that the processing devices 120_1 to 120_3 are active, the processing devices 120_4 to 120_6 are inactive, and operational status information 116 as illustrated in FIG. 10 is set in the operational status information storage unit 115. It is also assumed that the active processing devices 120_1 to 120_3 are calculating correlation functions.

After a predetermined period of time has elapsed since the first metric number request from the processing units 121 (the start of calculation of correlation functions by the processing units 121), the processing device control unit 114 of the management device 110 calculates predicted processing time required for all pairs among N types of metrics (step S301). The processing device control unit 114 calculates the predicted processing time for all pairs on the basis of, for example, the elapsed time and the number of pairs for which correlation functions have been calculated in the processing results 133.

If the calculated predicted processing time exceeds processing completion time (Y at step S302), the processing device control unit 114 refers to the operational status information 116 to calculate the number of processing devices 120 required for calculating correlation functions for all pairs within the processing completion time (step S303). It is assumed here that the processing completion time is preset by a person such as a system administrator on the basis of time a correlation model takes to change or other factors. The processing device control unit 114 calculates the number of processing devices 120 required for calculating correlation functions for all pairs within the processing completion time on the basis of the elapsed time mentioned above, the number of pairs for which correlation functions have been calculated, and the number of active processing devices 120 that is acquired from the operational status information 116.

The processing device control unit 114 activates inactive processing devices 120 so that the number of the active processing devices 120 becomes equal to the calculated number (step S304). The processing device control unit 114 updates the operational status relating to the activated processing devices 120 in the operational status information 116.

Then the newly activated processing devices 120, in addition to the processing devices 120 that have been active, perform the process from step S201 through S213 to calculate correlation functions.

For example, if correlation functions for one third of the pairs have been calculated in the elapsed time, ½×T, where T is the predetermined processing completion time, the processing device control unit 114 calculates predicted processing time as 3/2×T. Since correlation functions for ⅔ of all of the pairs need to be calculated in the remaining ½×T of the predetermined processing completion time, the processing device control unit 114 calculates the required number of processing devices 120 as 6. The processing device control unit 114 activates the inactive processing devices 120_4 to 120_6. Then the processing devices 120_4 to 120_6, in addition to the processing device 120_1 to 120_3, calculate correlation functions.

Note that the processing device control unit 114 may present the calculated predicted processing time to the administrator or other person at step S303 and may activate inactive processing devices 120 in accordance with an instruction from the administrator or the person.

Furthermore, the processing device control unit 114 may calculate the required number of processing devices 120 on the basis of the load on each processing device 120 and may activate inactive processing devices 120 accordingly.

If the processing devices 120 are virtual machines, the processing device control unit 114 may add processing devices 120 by deploying new virtual machines on the computer.

Advantageous effects of the second exemplary embodiment of the present invention will be described below.

According to the second exemplary embodiment of the present invention, calculation of correlation functions for all pairs among N types of metrics can be completed within the processing completion time. This is because if predicted processing time is greater than the processing completion time, the processing device control unit 114 calculates the number of processing devices 120 required for calculating correlation functions for all pairs within the processing completion time and adds processing devices 120 to accelerate the correlation function calculation processing.

Furthermore, according to the second exemplary embodiment of the present invention, the correlation calculation processing can be readily accelerated. This is because the processing by the management device 110 and each processing device 120 does not depend on the number of processing devices 120 and therefore, processing devices 120 can be easily added.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

For example, while the exemplary embodiments of the present invention have been described with an example in which a correlation function is calculated as the distribution processing for each pair of a plurality of types of data by a plurality of processing devices 120, any other arithmetic process for pairs of a plurality of types of data may be performed instead of calculation of correlation functions.

Furthermore, while a single management device 110 and a single processing result collection device 130 are provided in the exemplary embodiments of the present invention, a plurality of management devices 110 and a plurality of processing result collection devices 130 may be used. In that case, allocation of metrics to the processing devices 120 and transmission of metric data are performed from the plurality of management devices 110 in a distributed manner. Collection of correlation functions from the processing devices 120 is performed by the plurality of processing result collection devices 130 in a distributed manner. This enables efficient distributed processing, even if there are many processing devices 120, or the bandwidths of communication or I/O among the management devices 110, the processing devices 120 and the processing result collection devices 130 reach the upper limits.

This application is based upon and claims the benefit of priority from Japanese Patent Application No. 2012-241993, filed on Nov. 1, 2012, the disclosure of which is incorporated herein in its entirety by reference.

REFERENCE LIST

100 Distributed data processing system
110 Management device
111 Management unit
112 Data storage unit
113 Processing data
114 Processing device control unit
115 Operational status storage unit
116 Operational status information
120 Processing device
121 Processing unit
122 Temporary storage unit
130 Processing result collection device
131 Processing result collection unit
132 Processing result storage unit
133 Processing results
200 Information collection device
300 Correlation destruction detection device
400 Failure analysis device
500 Operation management system
600 System under analysis

What is claimed is:

1. A distributed data processing system performing a predetermined arithmetic process on each of pairs of N types of data, where N is a natural number greater than or equal to 2, the distributed data processing system comprising:
a management device comprising:
a memory for storing instructions, and
one or more processors configured to execute the instructions to:
allocate each of first to (N−1)th types of data out of the N types of data to any one of processing devices being active among a plurality of processing devices; and
each of the plurality of processing devices comprises:
a memory for storing instructions, and
one or more processors configured to execute the instructions to:
when the processing device is active and (i)th type of data is allocated to the processing device by the management device, execute the predetermined arithmetic process on pairs of the (i)th type of data and each of (i+1)th to (N)th types of data, where i is a natural number greater than or equal to 1 and less than or equal to N−1,
wherein the one or more processors of the management device are further configured to execute the instructions to:
calculate a predicted processing time required for executing the predetermined arithmetic process for all of the pairs of the N types of data by the processing devices being active among the plurality of processing devices, based on a number of pairs of types of data for which the predetermined arithmetic process has been executed,
when the predicted processing time exceeds a predetermined processing completion time, calculate a number of the processing devices required for executing the predetermined arithmetic process for all of the pairs of the N types of data within the predetermined processing completion time, and
activate processing devices being inactive among the plurality of processing devices in such a way that the number of processing devices being active becomes equal to the calculated number of the processing devices, wherein the N types of data are measured values of N types of metrics in a system, and wherein the one or more processors of each of the plurality of processing devices is further configured to execute the instructions to calculate a correlation function for pairs of a measured value of the (i)th metric and a measured value of each of the (i+1)th to the (N)th metrics, the (i)th metric being allocated by the management device.

2. The distributed data processing system according to claim 1, wherein the one or more processors of each of the plurality of processing devices is further configured to execute the instructions to:

acquire the (i)th type of data and the (i+1)th to the (N)th types of data from a data storage storing the N types of data, and execute the predetermined arithmetic process.

3. The distributed data processing system according to claim 1, wherein the one or more processors of each of the plurality of processing devices is further configured to execute the instructions to:

store the (i)th type of data acquired from a data storage in a first temporary storage of the processing device, and use the data stored in the first temporary storage to execute the predetermined arithmetic process on pairs of the (i)th type of data and each of the (i+1)th to the (N)th types of data.

4. The distributed data processing system according to claim 1, wherein the one or more processors of each of the plurality of processing devices is further configured to execute the instructions to:

store at least some of the (i+1)th to the (N)th types of data acquired from a data storage in a second temporary storage of the processing device, and when (k)th type of data is newly allocated by the management device, use the data stored in the second temporary storage to execute the predetermined arithmetic process on pairs of the (k)th type of data and each of (k+1)th to the (N)th types of data, where k is a natural number greater than or equal to 1 and less than or equal to N−1.

5. The distributed data processing system according to claim 1, wherein the one or more processors of the management device is further configured to execute the instructions to:

allocate the first to the (N−1)th types of data out of the N types of data to any of the plurality of processing devices in order.

6. A management device in a distributed data processing system performing a predetermined arithmetic process on each of pairs of N types of data, where N is a natural number greater than or equal to 2, the management device comprising:

a memory for storing instructions, and one or more processors configured to execute the instructions to:

allocate each of first to (N−1)th types of data out of the N types of data to any one of processing devices being active among a plurality of processing devices, each of which executes, when the processing device is active and (i)th type of data is allocated to the processing device by the management device, the predetermined arithmetic process on pairs of the (i)th type of data and each of (i+1)th to (N)th types of data, where i is a natural number greater than or equal to 1 and less than or equal to N−1, calculate a predicted processing time required for executing the predetermined arithmetic process for all of the pairs of the N types of data by the processing devices being active among the plurality of processing devices, based on a number of pairs of types of data for which the predetermined arithmetic process has been executed, when the predicted processing time exceeds a predetermined processing completion time, calculate a number of the processing devices required for executing the predetermined arithmetic process for all of the pairs of the N types of data within the predetermined processing completion time, and activate processing devices being inactive among the plurality of processing devices in such a way that the number of processing devices being active becomes equal to the calculated number of the processing devices, wherein the N types of data are measured values of N types of metrics in a system, and wherein one or more processors of each of the plurality of processing devices is configured to execute the instructions to calculate a correlation function for pairs of a measured value of the (i)th metric and a measured value of each of the (i+1)th to the (N)th metrics, the (i)th metric being allocated by the management device.

7. A processing device in a distributed data processing system performing a predetermined arithmetic process on each of pairs of N types of data, where N is a natural number greater than or equal to 2, the processing device comprising:

a memory for storing instructions, and one or more processors configured to execute the instructions to:

execute, when the processing device is active and (i)th type of data is allocated to the processing device by a management device which allocates each of first to (N−1)th types of data out of the N types of data to any one of processing devices being active among a plurality of the processing devices, the predetermined arithmetic process on pairs of the (i)th type of data and each of (i+1)th to (N)th types of data, where i is a natural number greater than or equal to 1 and less than or equal to N−1, wherein the management device comprises one or more processors configured to execute instructions to:

calculate a predicted processing time required for executing the predetermined arithmetic process for all of the pairs of the N types of data by the processing devices being active among the plurality of processing devices, based on a number of pairs of types of data for which the predetermined arithmetic process has been executed, when the predicted processing time exceeds a predetermined processing completion time, calculate a number of the processing devices required for executing the predetermined arithmetic process for all of the pairs of the N types of data within the predetermined processing completion time, and activate processing devices being inactive among the plurality of processing devices in such a way that the number of processing devices being active becomes equal to the calculated number of the processing devices, wherein the N types of data are measured values of N types of metrics in a system, and wherein the one or more processors of each of the plurality of processing devices is further configured to execute the instructions to calculate a correlation function for pairs of a measured value of the (i)th metric and a measured value of each of the (i+1)th to the (N)th metrics, the (i)th metric being allocated by the management device.

8. A distributed data processing method for performing a predetermined arithmetic process on each of pairs of N types of data, where N is a natural number greater than or equal to 2, the distributed data processing method comprising:

in a management device, allocating each of first to (N−1)th types of data out of the N types of data to any one of processing devices being active among a plurality of processing devices; and in each of the plurality of processing devices, when the processing device is active and (i)th type of data is allocated to the processing device by the management device, executing the predetermined arithmetic process on pairs of the (i)th type of data and each of (i+1)th to (N)th types of data, where i is a natural number greater than or equal to 1 and less than or equal to N−1; and in the management device, calculating a predicted processing time required for executing the predetermined arithmetic process for all of the pairs of the N types of data by the processing devices being active among the plurality of processing devices, based on a number of pairs of types of data for which the predetermined arithmetic process has been executed, when the predicted processing time exceeds a predetermined processing completion time, calculating, by the management device, a number of the processing devices required for executing the predetermined arithmetic process for all of the pairs of the N types of data within the predetermined processing completion time, and activating, by the management device, processing devices being inactive among the plurality of processing devices in such a way that the number of processing devices being active becomes equal to the calculated number of the processing devices, wherein the N types of data are measured values of N types of metrics in a system, and wherein the method further comprises, in each of the plurality of processing devices, calculating a correlation function for pairs of a measured value of the (i)th metric and a measured value of each of the (i+1)th to the (N)th metrics, the (i)th metric being allocated by the management device.

9. The distributed data processing method according to claim 8, wherein, in each of the plurality of processing devices, acquiring the (i)th type of data and the (i+1)th to the (N)th types of data from a data storage storing the N types of data, and executing the predetermined arithmetic process.

10. The distributed data processing method according to claim 8, wherein, in each of the plurality of processing devices, storing the (i)th type of data acquired from a data storage in a first temporary storage of the processing device, and using the data stored in the first temporary storage to execute the predetermined arithmetic process on pairs of the (i)th type of data and each of the (i+1)th to the (N)th types of data.

11. The distributed data processing method according to claim 8, wherein, in each of the plurality of processing devices, storing at least some of the (i+1)th to the (N)th types of data acquired from a data storage in a second temporary storage of the processing device, and, when (k)th type of data is newly allocated by the management device, using the data stored in the second temporary storage to execute the predetermined arithmetic process on pairs of the (k)th type of data and each of (k+1)th to the (N)th types of data, where k is a natural number greater than or equal to 1 and less than or equal to N−1.

12. The distributed data processing method according to claim 8, wherein in the management device, allocating the first to the (N−1)th types out of the N types of data to any of the plurality of processing devices in order.

13. A non-transitory computer readable storage medium recording thereon a program for a management device in a distributed data processing system performing a predetermined arithmetic process on each of pairs of N types of data, where N is a natural number greater than or equal to 2, causing a computer to perform a method comprising:

allocating each of first to (N−1)th types of data out of the N types of data to any one of a plurality of processing devices, each of which executes, when (i)th type is allocated to the processing device by the management device, the predetermined arithmetic process on pairs of the (i)th type of data and each of (i+1)th to (N)th types of data, where i is a natural number greater than or equal to 1 and less than or equal to N−1, calculating, by the management device, a predicted processing time required for executing the predetermined arithmetic process for all of the pairs of the N types of data by the processing devices being active among the plurality of processing devices, based on a number of pairs of types of data for which the predetermined arithmetic process has been executed, when the predicted processing time exceeds a predetermined processing completion time, calculating, by the management device, a number of the processing devices required for executing the predetermined arithmetic process for all of the pairs of the N types of data within the predetermined processing completion time, and activating, by the management device, processing devices being inactive among the plurality of processing devices in such a way that the number of processing devices being active becomes equal to the calculated number of the processing devices, wherein the N types of data are measured values of N types of metrics in a system, and wherein the method further comprises, in each of the plurality of processing devices, calculating a correlation function for pairs of a measured value of the (i)th metric and a measured value of each of the (i+1)th to the (N)th metrics, the (i)th metric being allocated by the management device.

14. A non-transitory computer readable storage medium recording thereon a program for a processing device in a distributed data processing system performing a predetermined arithmetic process on each of pairs of N types of data, where N is a natural number greater than or equal to 2, causing a computer to perform a method comprising:

executing, when (i)th type of data is allocated to the processing device by a management device which allocates each of first to (N−1)th types of data out of the N types of data to any one of a plurality of the processing devices, the predetermined arithmetic process on pairs of the (i)th type of data and each of (i+1)th to (N)th types of data, where i is a natural number greater than or equal to 1 and less than or equal to N−1, calculating, by the management device, a predicted processing time required for executing the predetermined arithmetic process for all of the pairs of the N types of data by the processing devices being active among the plurality of processing devices, based on a number of pairs of types of data for which the predetermined arithmetic process has been executed, when the predicted processing time exceeds a predetermined processing completion time, calculating, by the management device, a number of the processing devices required for executing the predetermined arithmetic process for all of the pairs of the N types of data within the predetermined processing completion time, and activating, by the management device, processing devices being inactive among the plurality of processing devices in such a way that the number of processing devices being active becomes equal to the calculated number of the processing devices, wherein the N types of data are measured values of N types of metrics in a system, and wherein the method further comprises, in each of the plurality of processing devices, calculating a correlation function for pairs of a measured value of the (i)th metric and a measured value of each of the (i+1)th to the (N)th metrics, the (i)th metric being allocated by the management device.

* * * * *